(12) United States Patent
Mahoor et al.

(10) Patent No.: US 11,890,748 B2
(45) Date of Patent: *Feb. 6, 2024

(54) SOCIALLY ASSISTIVE ROBOT

(71) Applicant: Dream Face Technologies, LLC, Lone Tree, CO (US)

(72) Inventors: Mohammad H. Mahoor, Centennial, CO (US); Joshua T. Lane, Englewood, CO (US); Hojjat Abdollahi Pourhaghighi, Denver, CO (US); Eshrat S. Emamian, Lone Tree, CO (US)

(73) Assignee: Dream Face Technologies, LLC, Lone Tree, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,640

(22) Filed: Jan. 14, 2022

(65) Prior Publication Data

US 2022/0227003 A1 Jul. 21, 2022

Related U.S. Application Data

(63) Continuation of application No. 16/158,542, filed on Oct. 12, 2018, now Pat. No. 11,279,041.

(51) Int. Cl.
*B25J 11/00* (2006.01)
*B25J 9/16* (2006.01)
(Continued)

(52) U.S. Cl.
CPC ......... *B25J 11/0015* (2013.01); *B25J 9/1697* (2013.01); *B25J 11/001* (2013.01);
(Continued)

(58) Field of Classification Search
CPC .... B25J 11/0015; B25J 9/1697; B25J 11/001; B25J 13/003; B25J 11/003; G06V 40/174;
(Continued)

(56) References Cited

U.S. PATENT DOCUMENTS

| 8,996,429 B1 * | 3/2015 | Francis, Jr. | G06N 3/008 706/45 |
| 2001/0001318 A1 * | 5/2001 | Kamiya | G06N 3/008 700/264 |

(Continued)

*Primary Examiner* — Abby Y Lin
*Assistant Examiner* — Dylan M Katz (57) ABSTRACT

A companion robot is disclosed. In some embodiments, the companion robot may include a head having a facemask and a projector configured to project facial images onto the facemask; a facial camera; a microphone configured to receive audio signals from the environment; a speaker configured to output audio signals; and a processor electrically coupled with the projector, the facial camera, the microphone, and the speaker. In some embodiments, the processor may be configured to receive facial images from the facial camera; receive speech input from the microphone; determine an audio output based on the facial images and/or the speech input; determine a facial projection output based the facial images and/or the speech input; output the audio output via the speaker; and project the facial projection output on the facemask via the projector.

27 Claims, 7 Drawing Sheets

(51) Int. Cl.
  *B25J 13/00* (2006.01)
  *G10L 25/63* (2013.01)
  *G06V 40/16* (2022.01)
  G06F 3/0481 (2022.01)
  G09G 3/00 (2006.01)
  G06F 3/16 (2006.01)

(52) U.S. Cl.
  CPC .......... *B25J 13/003* (2013.01); *G06V 40/174* (2022.01); *G10L 25/63* (2013.01); *B25J 11/003* (2013.01); *G06F 3/0481* (2013.01); *G06F 3/16* (2013.01); *G09G 3/002* (2013.01)

(58) Field of Classification Search
  CPC ..... G06V 40/168; G10L 25/63; G06F 3/0481; G06F 3/16; G06F 3/147; G06F 3/167; G09G 3/002; H04N 9/3141
  See application file for complete search history.

(56) References Cited

U.S. PATENT DOCUMENTS

| | | | |
|---|---|---|---|
| 2007/0198128 A1* | 8/2007 | Ziegler | G06N 3/008 700/245 |
| 2019/0105783 A1* | 4/2019 | Al Moubayed | B25J 11/0015 |
| 2019/0184574 A1* | 6/2019 | Chen | A61G 15/007 |
| 2019/0193273 A1* | 6/2019 | Favis | B25J 11/0015 |
| 2019/0240842 A1* | 8/2019 | Hsu | H04W 4/80 |
| 2019/0366558 A1* | 12/2019 | Gupta | B25J 9/0009 |

* cited by examiner

SOCIALLY ASSISTIVE ROBOT

GOVERNMENT RIGHTS

This invention was made with government support under award number IIP-1548956 awarded by the National Science Foundation (NSF) and/or under award number 1 R44 AG059483-01 awarded by the National Institute on Aging a division of the National Institute of Health (NIA/NIH). The government has certain rights in the invention.

BACKGROUND

Current robot technologies have yet to reach the full emotional and social capabilities necessary for rich and robust interaction with human beings. Robots with emotional and social capabilities may be useful for interacting with people in home situations, such as elderly people, patients with Alzheimer's disease, dementia and/or depression, children with autism, or others who may benefit from an interactive social robot. Robotic heads that can model natural face-to-face communication with individuals in different social, learning, and therapeutic contexts may be desired. Such humanoid robots may help overcome the "Uncanny Valley" effect, where the effect of an aesthetic design of a robot may influence the user's experience, perception, and acceptance of the robot.

SUMMARY

A companion robot is disclosed. In some embodiments, the companion robot may include a head having a facemask and a projector (or an LED display) configured to project facial images onto the facemask; a facial camera; a microphone configured to receive audio signals from the environment; a speaker configured to output audio signals; and a processor electrically coupled with the projector, the facial camera, the microphone, and the speaker. In some embodiments, the processor may be configured to receive facial images from the facial camera; receive speech input from the microphone; determine an audio output based on the facial images and/or the speech input; determine a facial projection output based the facial images and/or the speech input; output the audio output via the speaker; and project the facial projection output on the facemask via the projector.

In some embodiments, the companion robot may also include a neck mechanism physically coupled with the head and in electrical communication with the processor. The processor may be configured to determine neck movement based on the audio output and/or the facial images, and/or to show head gestures for particular expressions, and/or track a user's face.

In some embodiments, the facial projection output comprises a facial expression selected from the list consisting of anger, joy, disgust, surprise, fear, and sadness.

In some embodiments, the processor is further configured to determine a user facial expression that is a representation of a facial expression of a user's face recorded by the facial camera, the audio output being determined based in part on the user facial expression.

In some embodiments, the processor is further configured to determine a user facial expression that is a representation of a facial expression of a user's face recorded by the facial camera, the facial expression being determined based in part on the user facial expression.

In some embodiments, the companion robot may also include a 3D camera configured to capture images of the environment that includes a plurality of pixels representing the visual environment and range data, the 3D camera in electrical communication with the processor. The processor may be further configured to receive 3D images from the 3D camera, wherein determining an audio output and/or determining a facial projection output is based at least in part on the 3D images.

Some embodiments include a companion robot that includes a head comprising a facemask and a projector configured to project facial images onto the facemask; a neck mechanism mechanically coupled with the head; a facial camera; a microphone configured to receive audio signals from the environment; and a processor electrically coupled with the projector, the facial camera, the neck mechanism, and the microphone. The processor may be configured to receive facial images from the facial camera; receive speech input from the microphone; determine a mood based on the speech input and/or the facial images; select a facial projection from a subset of facial projections based the mood; select a sequence of neck movements from a subset of neck movements based on the mood; move the head in accordance with the selected sequence of neck movements via the neck mechanism; and project the selected facial projection on the facemask via the projector.

In some embodiments, the companion robot may further include a speaker in electric communication with the processor, wherein the speaker is configured to output audio signals, wherein the processor is configured to determine an audio output based on the mood and output the audio output via the speaker.

In some embodiments, the subset of facial projections includes at least two facial expressions selected from the list consisting of anger, joy, disgust, surprise, fear, and sadness. In some embodiments, the mood includes a mood selected from the list consisting of anger, joy, disgust, surprise, fear, and sadness. In some embodiments, the mood includes a mood selected from the list consisting of positive, negative, and neutral expression. In some embodiments, emotion can be measured using a sentiment analysis. A sentiment analysis, for example, can include analyzing the words used by a user to determine the emotion or mood of the user.

In some embodiments, the companion robot may further include a 3D camera configured to capture images of the environment that includes a plurality of pixels representing the visual environment and range data, the 3D camera in electrical communication with the processor. In some embodiments, the processor is further configured to receive 3D images from the 3D camera, wherein determining an audio output and/or determining a facial projection output is based at least in part on the 3D images.

Some embodiments may include a method comprising: receiving facial images from a facial camera; receiving speech input from a microphone; determining with a processor a mood based on the speech input and/or the facial images; selecting a facial projection from a subset of facial projections based the mood; selecting a sequence of neck movements from a subset of neck movements based on the mood; moving a head in accordance with the selected sequence of neck movements; and projecting the selected facial projection on a facemask disposed on the head.

In some embodiments the selected facial projections are projected on the facemask using a projector disposed with the head. In some embodiments the head is moved using one or more neck mechanisms.

A companion robot is disclosed comprising a face screen configured to display facial images; a microphone configured to receive audio signals from the environment; a speaker configured to output audio signals; a graphical user interface; and a processor electrically coupled with the face screen, the microphone, the speaker, and the graphical user interface. In some embodiments, the processor may be configured to receive speech input from the microphone; determine an audio output based on the speech input; determine a face output based the speech input; present a first cognitive exercise to a user via the graphical user interface; receive a first response to the first cognitive exercise from the user via the graphical user interface; output the audio output via the speaker; and display the face output on the face screen.

In some embodiments, the first cognitive exercise comprises a presenting a cognitive game that includes one or more questions, and the first response is a response to at least one question. In some embodiments, the first cognitive exercise comprises displaying one or more images. In some embodiments, the first cognitive exercise is selected from a plurality of cognitive exercises based on the speech input. In some embodiments, the first cognitive exercise includes a reminder to perform a task. In some embodiments, the first cognitive exercise comprises a video conference.

These embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Some embodiments of the invention include a companion robot that can socialize with users. For example, a companion robot may express facial expressions, track a user's body and/or face, recognize a user's expressions, and/or react appropriately to the user's emotional state. The companion robot may also provide mental stimulation and/or companionship for its users through conversation, cognitive games, engagement in simple physical activities, reminiscence therapy, and/or music therapy, etc.

In some embodiments, activities enabled by the companion robot may assist elderly individuals with declining memory, cognition and attention. In some embodiments, the companion robot may engage a user in a wide range of activities, maintain each individual's daily schedule, and can stimulate elderly individuals' brain. In some embodiments, the companion robot may also provide reminders about daily activities and medications. In some embodiments, the companion robot can analyze seniors' behaviors and alert caregivers/nurses of a need.

In some embodiments, a companion robot may support one or more of the following activities: coordinated movements of the robots' head and neck; managing animation and visual speech during conversations; recognizing users' emotions via speech, sentiment analysis, and/or facial recognition; running cognitive games; reminding users of scheduled activities; alerting staff (e.g., based on absence of any activity for a period of time or based on emotional responses); empathize with users via facial expressions, head movements, arm movements, and/or speech; video calling; converse with a user about various topics; answer user questions; instruct a user about physical exercises; and/or providing activity reports.

In some embodiments, a companion robot may include a dialog management system that integrates emotional intelligence into spoken dialog with users. For example, rather than simply listening to, understanding, and responding to users' speech, a companion robot may interpret a user's affect (e.g., engagement, frustration, excitement, tone, facial expression, etc.), and produce contextually appropriate responses, facial expressions, and/or neck movements.

Figure 1:
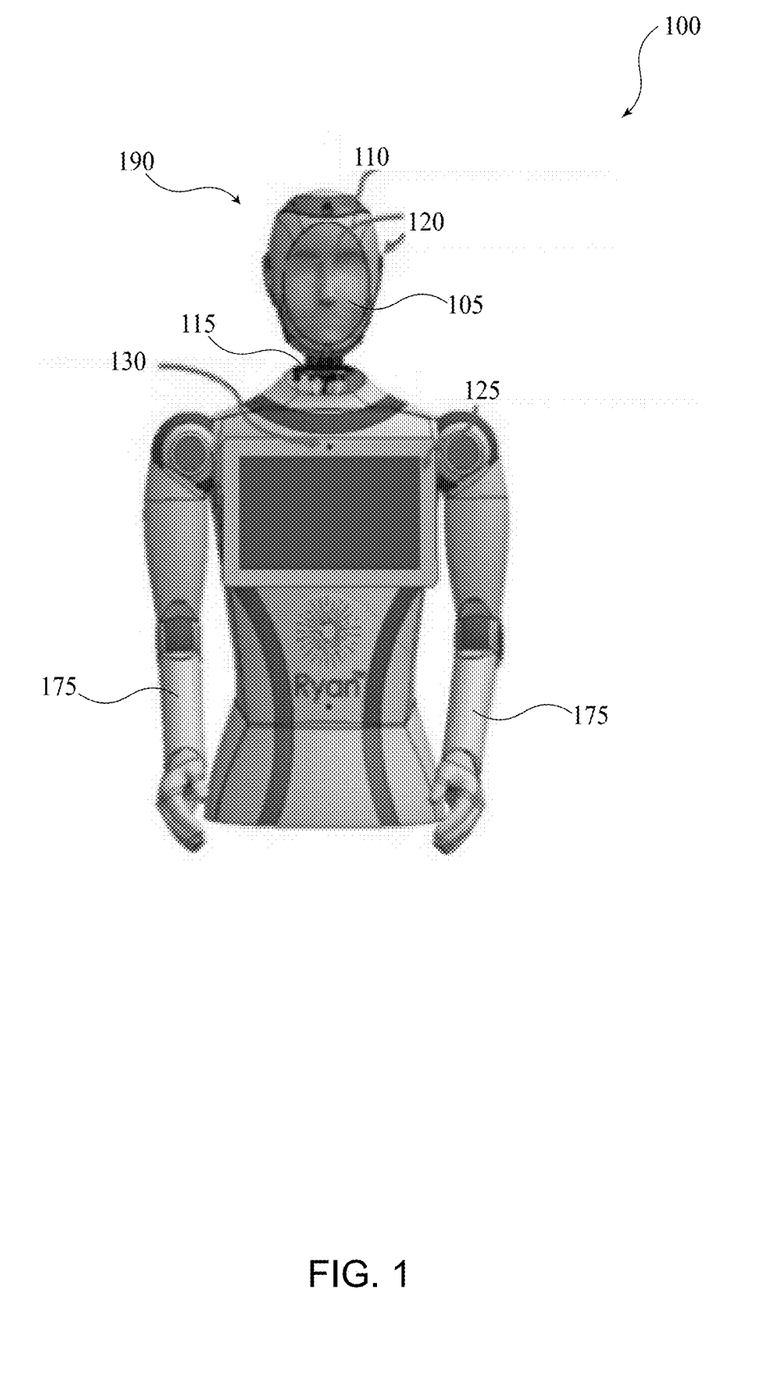
FIG. 1 is a front view of a companion robot with an exterior skin according to some embodiments.
Figure 2:
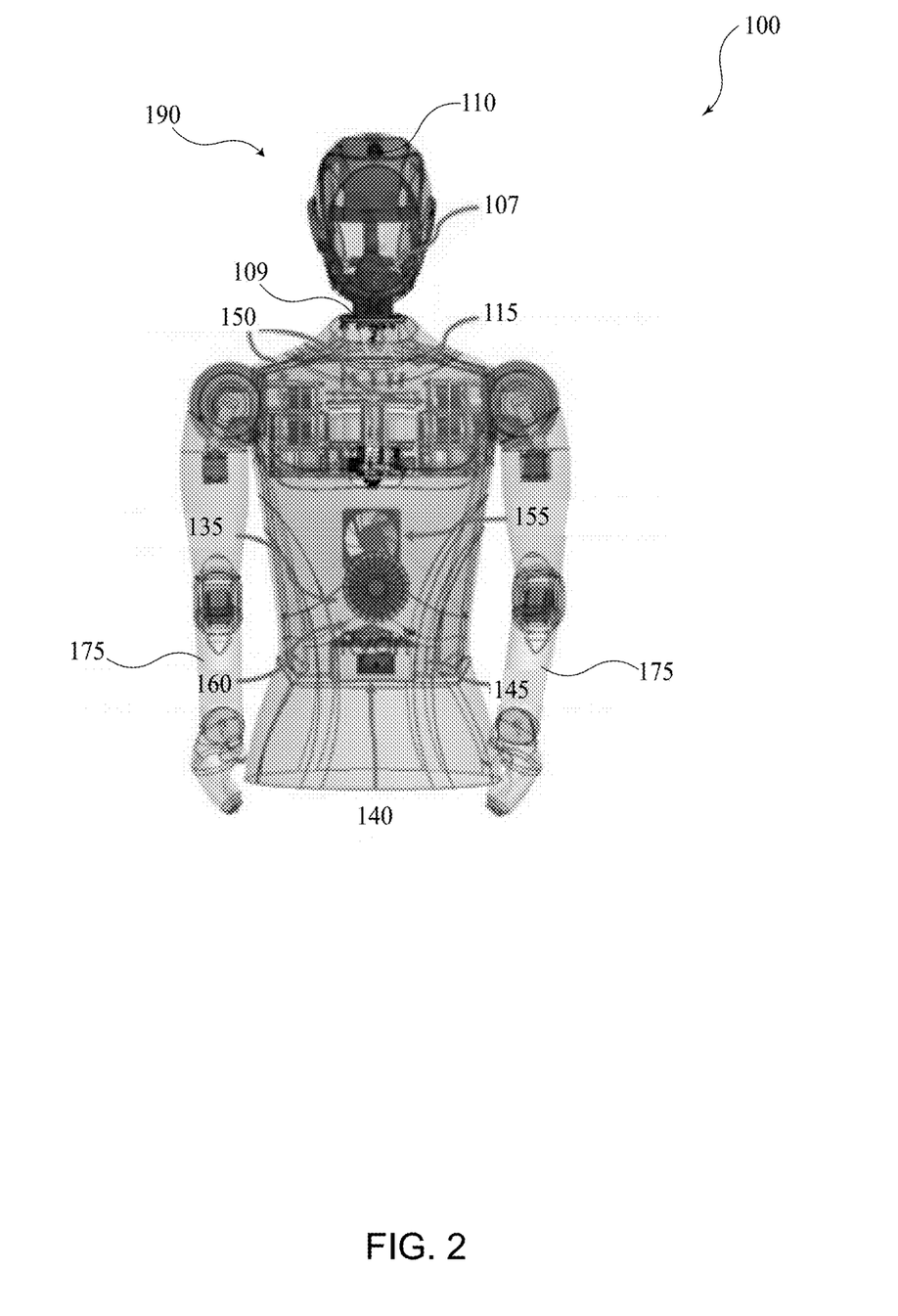
FIG. 2 is a transparent, front view of a companion robot without an exterior skin according to some embodiments.

FIG. 1 shows the companion robot 100 with an exterior skin and FIG. 2 shows the companion robot 100 without the exterior skin. The companion robot 100 may include a facemask 105, a projector 107, a facial camera 110, a neck mechanisms 115, indicator LEDs 120, a user interface 125, a 3D camera 130, a microphone 135, speaker(s) 140, a controller 145, a network interface, shoulder mechanisms 150, cooling fan 155, and/or a power inlet 160.

In some embodiments, the projector 107 and/or the facemask 105 may include the screens and/or projectors described in U.S. Pat. No. 9,810,975, titled "Rear-projected life-like robotic head", which is incorporated into this document by reference for all purposes. In some embodiments, the projector 107 may include any number of lens, mirrors, and/or other optical components.

In some embodiments, the facemask 105 may be disposed at the front of the head 190. The facemask 105, for example, may be removable and/or interchangeable with other face masks. In some embodiments, the facemask 105 may be a translucent face mask onto which the facial images may be projected. In some embodiments, the facemask 105 may be constructed or molded from a clear plastic and/or coated with rear projection paint. In some embodiments, the facemask 105 may be three dimensional, which may, for example, reduce the Mona Lisa Effect that may result when 3D objects are displayed on 2D surfaces. For example, the facemask 105 may include three dimensional features such as a nose, cheeks, lips, a forehead, etc.

In some embodiments, facial images may be projected onto the back surface of the facemask 105. For example, facial images may be created using a character animation application and/or may include natural speech and facial expressions that is projected on to the back of the facemask 105. The facial images may, for example, be cartoon-like, animated, and/or photorealistic. In some embodiments, the character animation application may calibrate the facial images for a particular face mask.

In some embodiments, the projector 107 may be disposed within the head. The projector 107, for example, may project lifelike three dimensional facial models on to the facemask 105 that can express rich natural speech and/or facial expressions.

Figure 5:
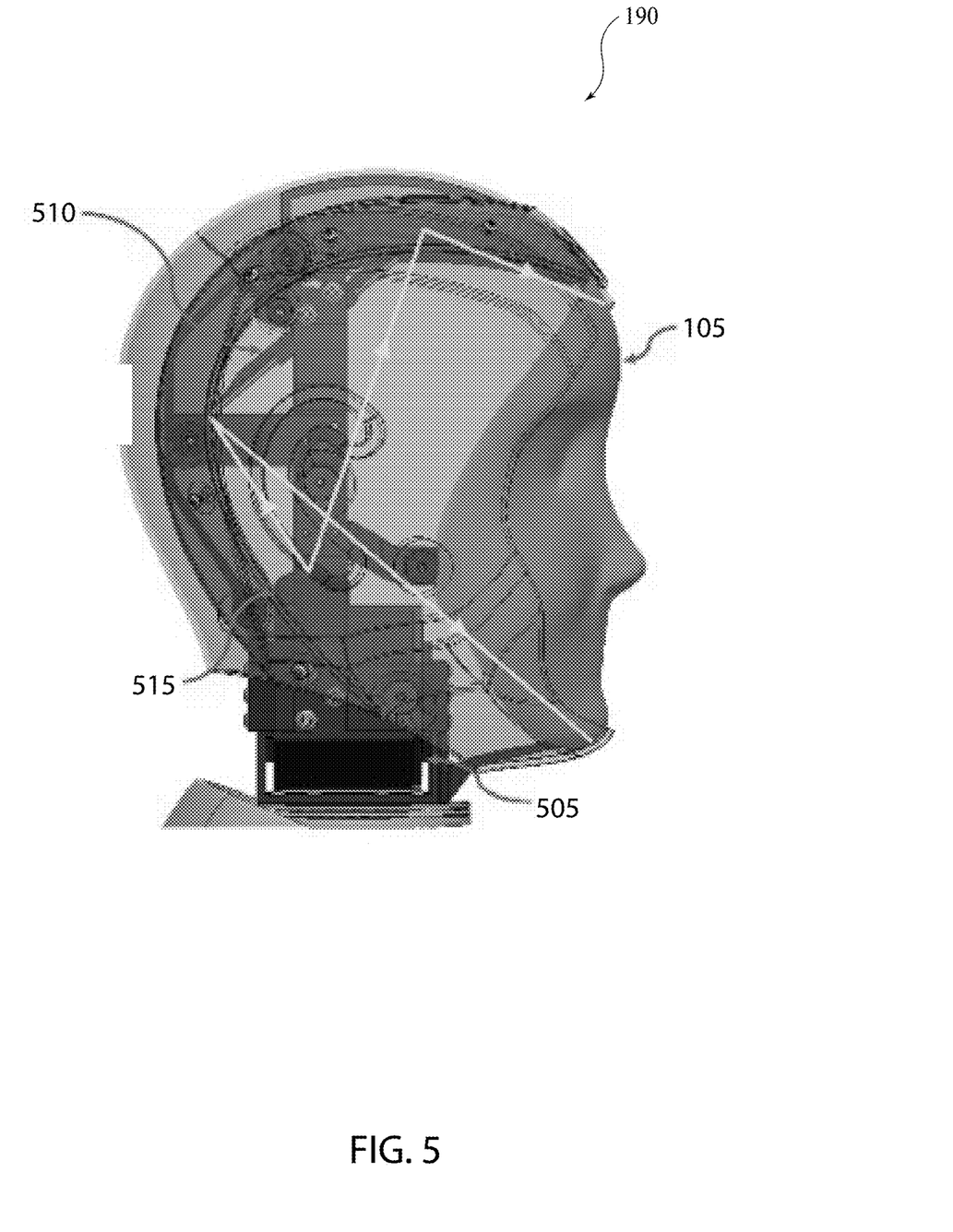
FIG. 5 is a sideview of a head according to some embodiments.

In some embodiments, the projector 107 may use rear-projection to project the facial image on the face mask as shown in FIG. 5. In some embodiments, the projector may include a lens and/or a mirror with a wide-projection angle, such as, for example, a fish eye lens. In some embodiments, a projector may be portable and/or miniature. In some embodiments, the projector may be high-resolution and/or high-luminosity. In some embodiments, the projector may be able to display a resolution of approximately 1200 by 800 pixels and may have a contrast ratio of approximately 10,000 to one. Some embodiments may include a projector that may be capable of up to, for example, 300 ANSI Lumens under normal indoor illumination conditions. The projector may, for example, include a Dell DLP M110 portable projector (e.g., a DLP projector) or other similar DLP projector. The projector may also include a portable projector such as, for example, a smart pico projector manufactured by AAXA Technologies or the like.

In some embodiments, the projection system 107 may be disposed within the head 190 as shown in FIG. 5. For example, the projector may be disposed near the base of the head 190 (e.g., near the neck) and/or may project images onto a mirror disposed near the back or the top of the head 190. The mirror may reflect images onto the face mask.

In some embodiments, the facemask 105 and/or the projection system 107 may be replaced with an LED display that can be used to display facial images. The LED display may be disposed on the front of the head 190.

In some embodiments, the facial camera 110 may be disposed within the head 109 and/or may include any type of digital camera that can record images and/or video. The facial camera 110 may, for example, be focused and/or directed to collect images of a human within 2 to 10 feet from the companion robot. In some embodiments, the facial camera 110 may include an RGB web camera, for example, that captures images at 30 frames per second and/or with VGA resolution.

In some embodiments, the neck mechanisms 115 may include motors, gears, pulleys, etc. that can be used to move the neck and/or head 190 through two, three, or six degrees of freedom. In some embodiments, the neck mechanism may include six prismatic joints that actuate rods connected to the head through universal and/or spherical joints. The neck mechanisms 115, for example, may also translate the head forward and backwards as well as rotate (e.g. back in disbelief). In some embodiments, the center of rotation of the head can also be shifted along the cervical spine to produce rotations about the centroid of the head or the base of the neck for different effect.

Studies have shown the head motion can be useful in communicating a physical-emotional response, for example, affirmation, impatience, disbelief, desire to speak, and/or empathy. The neck mechanism 115 may be able to provide head motion that can communicate such a physical-emotional response. The neck mechanisms 115, for example, may include any or all the components described in U.S. Pat. No. 9,810,975, titled "Rear-projected life-like robotic head", which is incorporated into this document by reference for all purposes.

In some embodiments, the neck mechanisms 115 may include multiple degrees of freedom. These degrees of freedom can include rotation of the head 190 about the center of the head 190, rotation of the head about the base of the neck, back and forth translation, side to side translation, head tilt, side to side tilt, etc. In some embodiments, the neck mechanisms 115 may include a pan/tilt unit that can produce yaw and pitch rotations of the head.

In some embodiments, the indicator LEDs 120 may indicate whether the companion robot 100 is on and/or functioning. In some embodiments, LEDs 120 can communicate various status information about the function of the companion robot 100 such as, for example, error messages, low power messages, alerts, etc.

In some embodiments, the user interface 125 may include any type of display such as, for example, a touchscreen display a tablet device, etc. For example, the user interface 125, may include an Apple iPad or a Microsoft Surface or any other type of device that can present data or information on display and/or receive inputs from a user through a touchscreen display. In some embodiments, the user interface 125 may provide a platform that allows a user to participate in cognitive games, reminiscence and music therapy, video chat with loved ones, etc. In some embodiments, the user interface 125 may provide a platform that allows a user to participate in audio-video calls (e.g., video conferencing) with another remotely located individual.

In some embodiments, the 3D camera 130 may include any type of three dimensional camera such as, for example, a Kinect RGB-D camera, an Intel RealSense camera (e.g., D435, D415, SR300, etc.), Orbbec Astra Mini, Asus Xtion2, or a similar camera. The 3D camera 130 may include a camera that produces a 2D image and the range to points in a scene from a specific point for each pixel. For example, the image may include, for example, RGB (red, green, blue) values and range values for points in the scene. The 3D camera 130 may, for example, provide 3D data to the controller 145 about the position of the user's body position, object localization with the scene, etc. The 3D images (or video) may be electronically transmitted to the controller 145.

In some embodiments, the microphone 135 may include any type of microphone that can collect audio. The microphone may include an analog-digital converter that can convert an audio signal to a digital audio signal. The digital audio signals may be transmitted to the controller 145.

In some embodiments, the speaker(s) 135 may include any type of speaker. The speakers, for example, may be used to produce voice audio signals provided, for example, by the controller 145.

Figure 6:
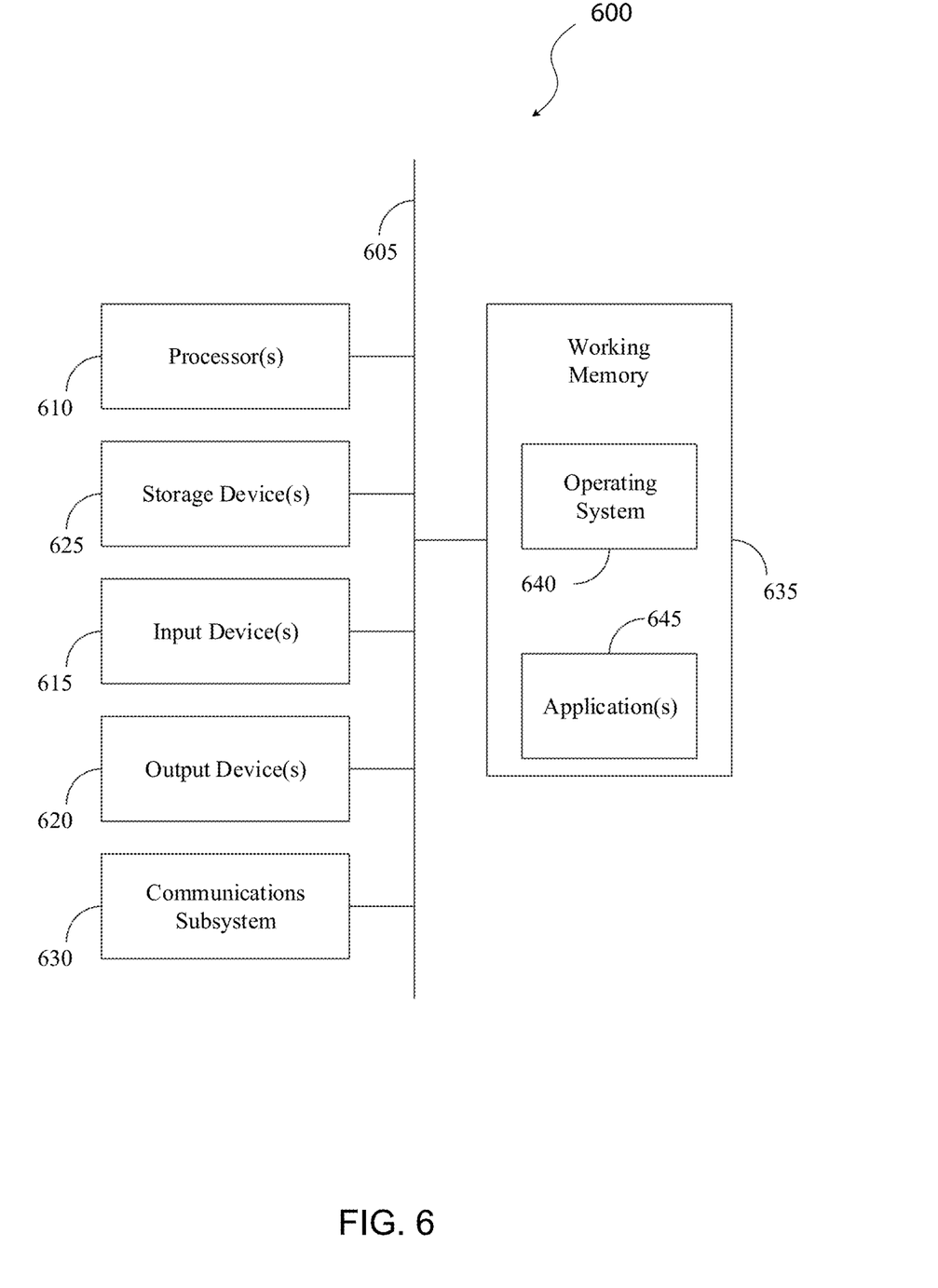
FIG. 6 shows an illustrative computational system for performing functionality to facilitate implementation of embodiments described herein.

In some embodiments, the controller 145 may include any or all components of computational system 600 shown in FIG. 6. In some embodiments, controller 145 may control the operation of the companion robot 100. The power inlet 160 may provide power to the various components of the companion robot 100. The cooling fan 155 may be used to cool various components within the companion robot 100. In some embodiments, a power supply or custom power distribution board may be used to distribute power to the various components that require electrical power.

In some embodiments, the controller 145 may include algorithms, processes, and/or software that interacts with a user via the various other components of the companion robot 100. For example, the controller 145 may maintain a user's daily schedule, stimulate a user's brain, provide reminders about daily activities and/or medications, analyze a user's behavior, alert caregivers/nurses of a need, play games with a user, empathize with a user, carry on a conversation with a user, instruct a user regarding physical activities, In some embodiments, the arms and shoulders mechanisms 150 may include motors, gears, pulleys, etc. that can be used to provide arm and hand emotive motions. Research has shown that humans who use emotive hand gestures while speaking are often viewed as warm, agreeable, and/or energetic whereas those with less animated speech are perceived as logical, cold, and/or analytical. The arms and shoulders mechanisms 150 may provide four degrees of freedom to the arms 175 that may be used to actively control the arms 175. In some embodiments, the arms and shoulders mechanism can be used to create gestures during dialog. These gestures may, for example, make interactions with the companion robot 100 more natural, physical, and/or animated.

In some embodiments, the arms and shoulders mechanisms 150 may also be used to demonstrate upper body exercises. In some embodiments, the arms 175 and/or shoulders may include elastic joints and/or limbs to mitigate harm from collisions and/or risk of injury.

In some embodiments, the arms and shoulders mechanisms 150 may include flexion/extension and/or abduction/adduction motions of the shoulder that may be actuated by a differential gear mechanism with counterweight springs to counter the static weight of the arm and reduce the motor power required. In some embodiments, medial and/or lateral rotation of the shoulder may be produced by a servo motor mounted in the upper arm. Elbow flexion/extension, for example, may be produced by a servo motor mounted in the elbow. In some embodiments, pneumatic artificial muscles (PAMs) may be used to actuate the arms. PAMs are characteristically similar to human muscles and can be used to create more natural, human-like arm motion.

In some embodiments, the arms and shoulders mechanisms 150 may include safety features such as, for example, a ring of sensors on its head to determine if any obstacles are in its workspace and slows or halts arm movement accordingly. In some embodiments, the arms and shoulders mechanisms 150 may include series elastic actuators that can sense interference from obstacles and act as shock absorbers in a collision to minimize damage. In some embodiments, the arms may include a clutch mechanism that releases the arms from the drive motor in response to hitting an obstacle and/or if the motor exerts additional torque.

In some embodiments, the arms and shoulders mechanisms 150 may or may not be included with the companion robot 100. In some embodiments, the arms and shoulders mechanisms 150 may be passive arms and/or shoulders.

In some embodiments, the arms 175 may include proximity and/or tactile sensors. Signals from the sensors may be used to trigger movement of the arms 175 and/or shoulders to avoid or mitigate injury.

The companion robot 100 may include a number of other components.

Figure 3:
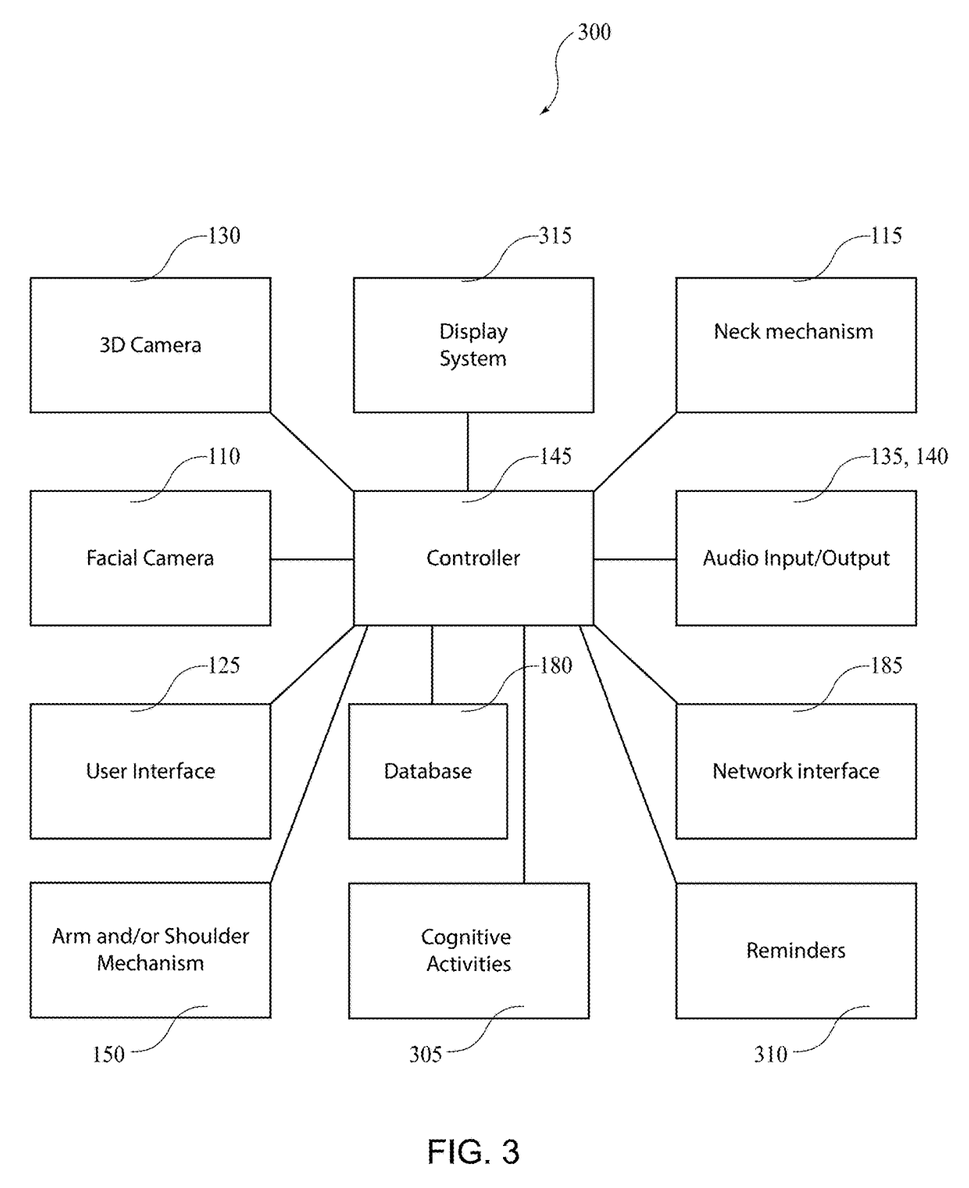
FIG. 3 is a block diagram of various components of a companion robot architecture according to some embodiments.

FIG. 3 is a block diagram of various components of a companion robot architecture 300 according to some embodiments. Any component may be added or removed. The companion robot architecture 300 may include the controller 145 that controls the operation of the various components. The controller 145 may include any or all components of computational system 600. The controller 145 may receive inputs from the various components, process the inputs from one or more components based on algorithms, software, routines, etc. and return commands to one or more components.

In some embodiments, the controller 145 may be coupled with the 3D camera 130. The 3D camera 130, for example, may provide data to the controller indicating the location of a user within the field of view of the 3D camera 130. For example, the 3D camera 130 may provide an image file that includes RGB (red, green, blue) values and range values for various points within the field of view. The controller can perform any number of visual processing functions or algorithms to make determinations about the user and/or the user's environment.

In some embodiments, the controller 145 may determine the activity level of the user based on images from the 3D camera 130. For example, if the controller 145 detects long periods of inactivity, the controller 145 may communicate such inactivity or send an alert to any individual such as, for example, care staff, physicians, family, etc., via the network interface 185. As another example, if the controller 145 detects inactivity during periods of time when activity is typically expected, the controller 145 may communicate such inactivity or an alert via the network interface 185.

In some embodiments, the controller 145 may determine the mood of the user based on images from the 3D camera 130. For example, the mood of the user can be determined based on energy level of the user, the location of the user, the motion of the user, the body language of the user, etc. In some embodiments, a visual processing algorithm may be used to determine the mood of the user based on the images from the 3D camera.

In some embodiments, the controller 145 may determine the activity level of the user during an exercise event. An application executing on the controller 145 may adjust the intensity of the exercise activity based on the user's activity level. For instance, if the user has low activity, the application may change the exercise In some embodiments, the controller 145 may be coupled with the display system 315. The display system may include one or more displays and/or projectors (e.g., projector 107 or LED display). In some embodiments, the controller 145 may select one or more facial expressions from a database of facial expressions (e.g., as stored in database 180), and send the selected facial expression to the display system 315 (e.g., the projector 107 that projects on the facemask 105 or displaying on an LED display). The facial expressions, for example, may be selected based on a mood of the user, which may, for example, be determined from the user's verbal responses, the user's facial expression, the user's speech, and/or the user's body image. In some embodiments, the database of facial expressions may include facial expressions that express the following moods: anger, joy, disgust, surprise, fear, neutral, contempt, compassion, and/or sadness.

In some embodiments, the controller 145 may be coupled with the neck mechanism 115. In some embodiments, the controller 145 may select one or more sequences of neck movements from a database of neck movements (e.g., as stored in database 180), and send the selected sequence of neck movements to the neck mechanism 115 to move the head 190. In some embodiments, the selected sequence of neck movements may be selected based on a mood. The sequence of neck movements, for example, may be selected based on the mood of the user, which may, for example, be determined from the user's verbal responses, the user's facial expression, and/or the user's body image. In some embodiments, the database of neck movements may include neck movements that express the following moods: anger, joy, disgust, surprise, fear, and sadness.

In some embodiments, the controller 145 may be coupled with the facial camera 110. The facial camera 110 may record images of a user's face. Any type of digital camera may be used.

In some embodiments, the controller 145 may be coupled with the audio input/output. The audio input may include a microphone 135. The microphone 135 may include a microphone array or a plurality of microphones. A microphone array, for example, may be used to locate the user based on their voice and/or may help distinguish who is talking in a crowded environment. The audio output may include one or more speaker 140. In some embodiments, the controller 145 may receive audio input from the microphone 135 and/or store the audio input into the database 180. Based at least in part on the content of the audio input, the controller can determine an audio output.

For example, using speech recognition, natural language processing, and/or dialog modeling techniques an audio output may be determined from the audio input. The audio output, for example, may be conversational speech. The audio output, for example, may be an answer in response to a question. The audio output, for example, may be an expression, articulation, recognition, or communication of emotion.

In some embodiments, the controller 145 may provide the audio output to the user via the speaker 140.

In some embodiments, the controller 145 may determine a mood of a user. The mood of the user may include anger, anxiety, disgust, dejection, fear, grief, guilt, joy, loneliness, love, sadness, shame, and/or surprise, etc. Any other mood may be determined. The mood, for example, may be determined based on facial images recorded by facial camera 110, body language of the user recorded by the 3D camera 130, the content of the language and/or the tone of the user received from the microphone 135, and/or the time of day or other historical data. Any techniques known in the art may be used to determine the mood of the user based on these inputs.

In some embodiments, emotion or mood can be measured or determined using a sentiment analysis. A sentiment analysis, for example, can include analyzing the words used by a user to determine the emotion or mood of the user. Any type of sentiment analysis tool, algorithm, process, etc. may be used to determine the mood or emotion of a user such as, for example, GATE plugins (e.g., SEAS(gsi-upm/SEAS) or SAGA(gsi-upm/SAGA)), Stanford Sentiment Analysis Module (e.g., Deeply Moving: Deep Learning for Sentiment Analysis), LingPipe (e.g., Sentiment Analysis Tutorial, TextBlob (e.g., Tutorial: Quickstart), Opinion Finder (e.g., OpinionFinder|MPQA), Clips pattern.en (e.g., pattern.en-|CLiPS), SentiWordNet, Bing Liu Datasets (Opinion Mining, Sentiment Analysis, Opinion Extraction), General Inquirer Dataset (e.g., General Inquirer Categories), MPQA Opinion Corpus (e.g., MPQA Resources), WordNet-Affect (e.g., WordNet Domains), SenticNet, Emoji Sentiment Ranking, etc.

In some embodiments, the companion robot 100 may express a mood by moving the head, projecting a facial image, and/or outputting speech based on the mood. For example, the controller 145 may select a sequence of neck movements corresponding to a mood, and the neck mechanism 115 may move the head in response the sequence of neck movements. As another example, the controller 145 may select a facial image corresponding to a mood, and the projection system 107 may project the facial image on the facemask 105 (or display the facial images on an LED display). As another example, the controller 145 may select a voice tone or words, phrases, or sentences based on a mood to the user via the speakers.

In some embodiments, the controller 145 may be coupled with the user interface 125. The controller 145 may receive user input via the user interface.

In some embodiments, the controller 145 may be coupled with a database 180. The database 180, for example, may include data relating a plurality of specific moods with a sequence of neck movements, a facial expression, a speech tone, or language. When a mood has been determined, a corresponding neck movement, an arm gesture, a facial expression, speech tone, or language may be selected from the database based on the mood.

In some embodiments, the database 180 may include a set of 3D modules that include a number of facial expressions. For example, the database 180 may include a plurality of polygons that define a face with facial expressions. The database 180 may also include a plurality of blends shapes (e.g., upper eye shapes and lower mouth shapes, etc.).

In some embodiments, the database 180 may include a plurality of different facial models (e.g., of a female, a male, an Asian, a Caucasian, a Hispanic, a Middle Eastern, an African, a Polynesian, an Indian, etc. face) face. These facial models may offer users a choice of appearances that may be more appealing to a specific user and can be changed based on user input or based on images received by the facial camera 110. In some embodiments, the facial models may include facial blendshapes (e.g., upper eye shapes and lower mouth shapes). In some embodiments, the facial models may animate between multiple shapes at a time. In some embodiments, these facial models may be generated with a character generation tool kit (e.g. Mixamo's Fuse), or a facial animation system created by Unity 3D. In some embodiments, the facial models can be combined to create a wide variety of facial expressions and/or visemes. In some embodiments, the facial models may co-articulate animations between different muscle groups in the face, creating a more life-like appearance of utterances and lip sync.

In some embodiments, the controller may include (or may be part of a separate image processor) a 3D Game Engine (e.g., Unity 3D) that can edit, process, and/or produce .anim files of a face that can then be output as a movie or image file that is projected onto the facemask by the projector.

In some embodiments, the database 180 may include user preferences, user expressions, user data, etc. that can be used by the controller to process user inputs (e.g., facial expressions, speech, etc.) and produce outputs (e.g., speech content, facial expressions, neck mechanism movements, etc.) that are related to a specific user. In some embodiments, the database may include specific user profiles consisting of user preferences, a history of interactions, a history of user moods, a history of user responses to robot actions or words, etc. that can be loaded upon facial recognition of the user or selection of the user's profile from the user interface.

In some embodiments, the database 180 may include relationships between facial expression data and user moods and/or behaviors. The controller 145 may compare facial expression data with a relationship table in the database 180 that relates facial expression data with moods to return the mood of a user. In some embodiments, the facial expression data in the table may be user specific.

In some embodiments, the database 180 may include relationships between speech data (e.g., semantic data) and user moods. The controller 145 may compare speech data with a relationship table in the database 180 that relates speech data with moods to return the mood of a user. In some embodiments, the speech data in the table may be user specific.

In some embodiments, the controller 145 may be coupled with a network interface 185. The network interface 185 may include a wired or wireless router. In some embodiments, audio input or filtered and/or modified audio input may be communicated over a network to a speech recognition and/or natural language processing server. An audio response, a mood, and/or text may be returned. In some embodiments, any of the process or methods described within this document may be performed at a remote server that can be communicated with via the network interface 185.

In some embodiments, the controller 145 may be coupled with the arms and shoulders mechanisms 150. The controller 145 may control the motion and/or actions of the arms 175 and/or shoulders via the arms and shoulders mechanisms 150. In some embodiments, the controller 145 may select one or more sequences of arm and/or neck movements from a database of arm and/or neck movements (e.g., as stored in database 180), and send the selected sequence of arm and/or shoulder movements to the arms and shoulders mechanisms 150 to move the arms 175 and/or shoulders. In some embodiments, the selected sequence of arm and/or shoulder movements may be selected based on a mood. The sequence of arm and/or shoulder movements, for example, may be selected based on the mood of the user, which may, for example, be determined from the user's verbal responses, the user's facial expression, and/or the user's body image. In some embodiments, the database of arm and/or shoulder movements may include arm and/or shoulder movements that express the following moods: anger, joy, disgust, surprise, fear, and sadness.

In some embodiments, the controller may also provide a cognitive activities to a user, for example, via block 305. These cognitive activities may be provided to the user in conjunction with one or more other blocks such as, for example, via user interface 125, audio input/output 135, 140, display system 315, etc. The cognitive activities may include cognitive games, quizzes, questions and answers, displaying images, displaying images of the user's family and/or past, directing the user in exercises, displaying music, etc. In some embodiments, the cognitive activities at block 305 may be provided in response to the mood of the user.

In some embodiments, the controller may also provide reminders to a user, for example, via block 310. These reminders may be provided to the user in conjunction with one or more other blocks such as, for example, via user interface 125, audio input/output 135, 140, display system 315, etc. The reminders may include reminders to take medication, reminders to attend an appointment, reminders to perform an activity, reminders to attend to personal hygiene, etc. In some embodiments, the reminders at block 310 may be provided in response to the mood of the user. In some embodiments, these reminders may be visual and/or audio reminders.

Figure 4:
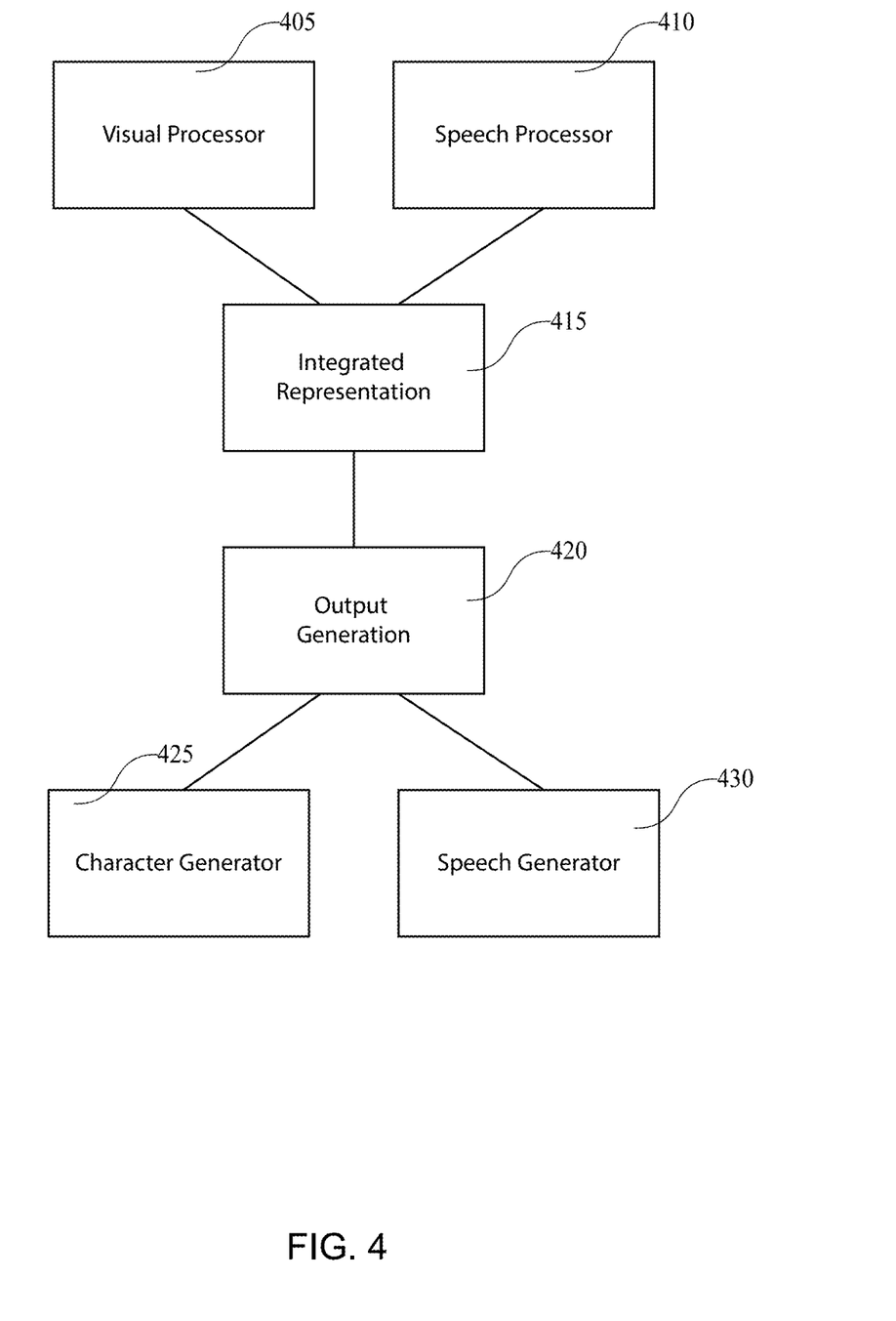
FIG. 4 is a block diagram illustrating a plurality of processing modules of the controller according to some embodiments.

FIG. 4 is a block diagram illustrating a plurality of processing modules of the controller 145. The various modules may be implemented either in software and/or in hardware. Other processing modules may be included. One or more of the modules may be removed.

In some embodiments, an audio input received from the microphone 135 may be processed via the speech processor 410. The speech processor 410 may perform a number of activities. The speech processor 410, for example, may filter out non-speech sounds such as background noise until speech is detected. When speech is detected, for example, the speech may be decoded into word strings. An emotion classifier may attach emotions to the strings based on the language content of the speech and/or based on the acoustic properties of the speech (e.g., tone). The speech may then be semantically parsed producing a semantic representation of the speech. The semantic representation of the speech may be stored in the database 180 along with speech emotion tags (or markers). The speech emotion tags may be saved in the dataset 180. The speech emotion tags may include the emotions of anger, anxiety, disgust, dejection, fear, grief, guilt, joy, loneliness, love, sadness, shame, and/or surprise, etc.

In some embodiments, the speech processor 410 may produce a semantic representation of the user's speech using a dialog manager such as for example a Phoenix parser. Speech, for example, may be mapped onto a sequence of semantic frames (e.g., task frames). This representation may be considered a shallow semantic representation that represents the entities, events and relations between them. Grammars, for example, are used to match word strings against patterns for the frame elements. These may be considered Context Free patterns where the non-terminals are concepts, events, and/or relations that may be important in the domain. The grammar rules, for example, may be written manually or trained from an annotated database. In some embodiments, the extracted frame information may be augmented by the speech-based emotion classification, vision-based emotion classification, face tracking and gaze detection features to create the extracted representation of the last utterance.

As another example, a dialog manager may use a task file that determines how the companion robot may interact with a user in response to the user's speech and affect (e.g., engagement, frustration, excitement, tone, facial expression, etc.). In some embodiments, The task file may include definitions of the task frames to be used by the application. A task frame is a data object that contains the information necessary to interact about the frame, these may include, for example: a) Frame Elements—the extracted information (e.g., speech and/or affect); b) Templates for generating responses from items in the context based on the extracted information; and/or c) Pattern-Action pairs, called rules, for generating responses, which may include word strings, neck movement sequences, and/or facial expressions. In some embodiments, a dialog manager may interpret a user's facial expressions, eye gaze, and/or speech prosody to convey affect and/or produce corresponding facial expressions, eye gaze, and/or speech prosody. For example, when the user is speaking, the companion robot can smile and nod to indicate it understands or agrees with what the user is saying. As another example, the head may be moved by neck mechanisms to produce head nods or rotation of the head while listening or thinking, which may be synchronized with spoken utterances and the location of the user in space.

In some embodiments, the visual processor 405 may receive video input from either or both the 3D camera 130 and/or the facial camera 110. The visual processor 405 may perform facial detection, facial tracking, and/or gaze detection, etc. The visual processor 405 may also classify the emotion of the user based on features extracted from the facial image. These emotions may be stored in the database 180. In some embodiments, the database 180 may also include facial tracking data and/or gaze detection data. The visual processor 405 may also tag the images and/or video with vision emotion tags (or markers) based on emotions expressed by facial expressions, gaze detection, body language, etc. The emotion tags may represent the mood of the user. The vision emotion tags may be saved in the database 180. The vision emotion tags may include the emotions of anger, anxiety, disgust, dejection, fear, grief, guilt, joy, loneliness, love, sadness, shame, and/or surprise, etc.

In some embodiments, convolutional neural networks and/or deep residual networks may be used to recognize facial expressions from the video input. The idea behind residual connections is that the forward and backward signals can be directly propagated from one block to any other block with an identity mapping as the skip connections. The identity mapping in these networks may, for example, achieve fast error reduction and low training loss during the training phase, yet having lower complexity compared with a shallower network without identity mapping. In some embodiments, several residual units with different filter sizes and number of channels may be stacked and a 32-layer Residual network can be trained for a facial expression module. The network can be trained on 400K human labeled facial expression images of AffectNet database. The training samples, for example, may cover unconstrained facial expressions captured from the Internet by querying different search. Hence, the network may be able to recognize facial expression an uncontrolled environment (aka wild setting) where the scene lighting, camera view, image resolution, background, users head pose, gender, and ethnicity can vary significantly.

In some embodiments, data from the visual processor 405 and/or the speech processor 410 may be processed by the integrated representation module 415. The integrated representation module 415 may integrate the speech portion of the audio input and the video input. In some embodiments, the integrated representation module 415 may combine the speech emotion tags with the vision emotion tags to create an integrated emotion (or mood). The integrated emotion may include the emotions of anger, anxiety, disgust, dejection, fear, grief, guilt, joy, loneliness, love, sadness, shame, and/or surprise, etc.

At block 420, an output may be generated based on the integrated emotion (or mood). The output may include, for example, an audio speech response and/or a visual response. For example, at block 420 semantic output and/or emotional output can be determined. The semantic output, for example, may include words, phrases, and/or sentences. The emotional output, for example, can include anger, anxiety, disgust, dejection, fear, grief, guilt, joy, loneliness, love, sadness, shame, and/or surprise, etc.

The output, for example, may be generated using machine learning algorithms that recognize affect through facial expression recognition and/or the parsing of spoken utterances for emotional content. The facial expression of a user may be identified as action units, for example, defined by the Facial Action Coding System (FACS). In some embodiments, the output can include a description of possible and/or visually detectable facial variations in terms of muscle-based action units. Facial expressions including the six basic/universal expressions can be modeled by a single action unit or combination of action units.

In some embodiments, block 420 may include a dialog management system that can be used to provide dialog with a user based on the user input. In some embodiments, a cloud-based dialog management system may be used. In some embodiments, a stand-alone chatbot system (e.g., Program-Y or Program-R or the like) or a web service for building and deploying a ChatBot (e.g. Pandorabot) may be used. Some ChatBots are built using the open source Artificial Intelligence Markup Language (AIML) framework.

An example, ChatBot is developed by either Mitsuku or Chomsky. Any type of ChatBox may be used such as, for example, a custom made ChatBox. One example Chatbox may be focused on questions and answers that are designed for people with Alzheimer's disease, depression, or any other illness.

In some embodiments, ChatBots may include user friendly. In some embodiments, a ChatBot can answer users' questions, tell them jokes, empathize with users, and have conversations about a number of subjects using AIML dialog scripts written for them. The ChatBot answers user's questions if the subject and answers are defined in the AIML scripts. If not the ChatBot would say "I do not know the answer" or "I wish I knew the answer" and may be taught the correct response. ChatBot can also be customized and remember personal information provided by the users talking to them (e.g., as stored in the database 180).

In some embodiments, the dialog management system can have dialog with users about a plurality of different topics including sports, history, games, places, and/or locations, jokes, greetings, etc. In some embodiments, the dialog management system can also connect to Wikipedia (or any other online database such as www.answers.com) and answer user's questions if it cannot be found in the existing AIML files.

At block 425 the character of the companion robot can be determined based on the emotional output. A sequence of neck movements, for example, can be selected from the database 180 based on the emotional output. One or more facial expressions, for example, can be selected from the database 180 based on the emotional output. One or more visual speech actions, for example, can be selected from the database 180 based on the emotional output. These visual speech actions, for example, can include movement of the lips, tongue and/or jaw that corresponds with the semantic output. One or more arm or shoulder movements, for example, can be selected from the database 180 based on the emotional output.

In some embodiments, Mixamo's Fuse may be used at block 425 to determine visual speech actions that may be output via the projector on to the facemask. Mixamo's Fuse is a character generation toolkit that offers a base mesh of 10,000+ polygonal faces and/or a base library of 50 blendshapes (additional custom and corrective shapes will be modeled in Maya) that can be combined to create a wide variety of facial expressions and visemes. Using the "ShapeKey" facial animation technique, for example, each facial rig has the opportunity to co-articulate animations between different muscle groups in the face, creating a more life-like appearance of utterances and lip sync.

At block 430 speech output may be generated based on the semantic content. For example, the speech output may include an audio signal that can be sent to the speakers. The speech output can be generated using any type of text to speech process known in the art.

The following is an example interaction between a companion robot and a user. The user may interact with the companion robot by smiling and stating, "Good Morning." The microphone 135 may receive the user's voice. At block 410, the audio input signal may be processed and/or filtered to isolate the speech elements. The speech may be parsed to detect emotions and a semantic content of the speech may be determined and speech emotion tags may be created. This may be done based on the nature of the language and/or the tone of the voice. Speech emotion tags may be associated with the audio input. In this example, a happy speech emotion tag may be applied.

At block 405 the facial camera 110 may record images of the user while smiling. The smile may be detected. A vision emotion tag may be created and/or associated with the recorded images and/or timestamped. In this example, a happy vision emotional tag may be applied based at least in part on the user's smile.

At block 415 an integrated output may be created. In this example, because both the vision emotion tag and the speech emotion tag are both happy, the integrated output may also be happy.

At block 420 an output may be generated. This output may include speech, such as, for example, "Good morning to you too." And a happy character expression.

At block 425, audio speech may be created representing the phrase "Good morning to you too." At block 430, neck movements related to happiness and/or facial features related to happiness may be generated. At some point the speech, neck movements, body gesture, and/or facial features may be output via speakers, neck mechanisms, arms and/or shoulders, and/or projectors, respectively.

In some embodiments, the companion robot may engage with a user by performing a number of activities. These may include, for example, Montessori-Based activities, serious brain games, cognitive games, dementia therapy activities, memory treatment activities, spaced retrieval activities, etc.

FIG. 5 is a sideview of a robot head 190 according to some embodiments. The head 190 may include a projection system disposed within the head 190. A projector 505 (e.g., a laser projector) may be disposed near the base of the neck at the bottom of the head 190. Images may be projected through a wide angle lens 515 onto a mirror that then reflects the images onto the backside of the facemask 105. Alternatively, an LED display may be used to display facial images.

The computational system 600, shown in FIG. 6 can be used to perform any of the embodiments of the invention. For example, computational system 600 can be used to execute the various process and/or methods described in this document. As another example, computational system 600 can be used perform any calculation, identification and/or determination described here. Computational system 600 includes hardware elements that can be electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics processing units (GPUs), graphics acceleration chips, and/or the like); one or more input devices 615, which can include without limitation a mouse, a keyboard and/or the like; and one or more output devices 620, which can include without limitation a display device, a printer and/or the like.

The computational system 600 may further include (and/or be in communication with) one or more storage devices 625, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 600 might also include a communications subsystem 630, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 630 may permit data to be exchanged with a network (such as the network described below, to name one example), and/or any other devices described herein. In many embodiments, the computational system 600 will further include a working memory 635, which can include a RAM or ROM device, as described above.

The computational system 600 also can include software elements, shown as being currently located within the working memory 635, including an operating system 640 and/or other code, such as one or more application programs 645, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above.

In some cases, the storage medium might be incorporated within the computational system 600 or in communication with the computational system 600. In other embodiments, the storage medium might be separate from a computational system 600 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.) then takes the form of executable code.

Figure 7:
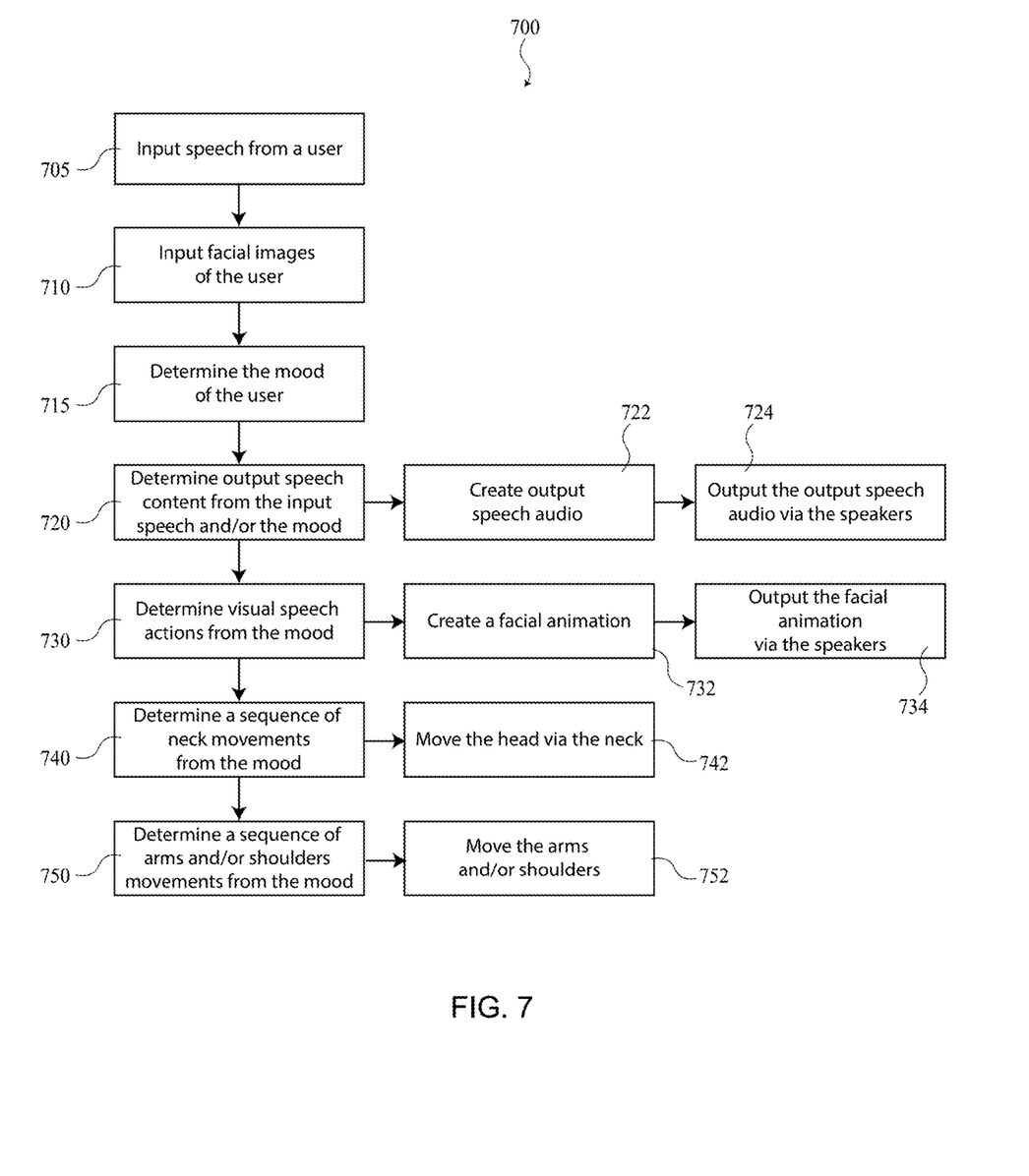
FIG. 7 is a flowchart of a process for controlling the speech and/or affect of a companion robot according to some embodiments.

FIG. 7 is a flowchart of a process 700 for controlling the speech and/or affect of a companion robot (e.g., companion robot 100) according to some embodiments. Various additional blocks may be added to process 700. In addition, any number of block may be removed, replaced and/or modified. In some embodiments, process 700 can be executed by controller 145.

Process 700 begins at block 705. At block 705, speech from a user can be input. The speech can be input, for example, via a microphone (e.g., microphone 135) and/or processed to filter out non-speech noise. The speech, for example, may be translated from audio to text.

At block 710 one or more facial images of the user may be input. The one or more facial images may be input from a camera (e.g., facial camera 110).

At block 715 the mood of the user may be determined from either or both the speech and the facial images. Various factors of the facial images can be analyzed to determine the mood of the user such as, for example, the motion and/or position of the eyebrows, the shape of the mouth, the eye gaze, the angle of the head, the tone of the speech, activity, and/or the speech prosody. A database can be used to translate the facial features into a mood.

The speech, for example, can be catalogued and/or processed to produce the semantic forms of the speech that can be used to determine the mood. A database can be used to translate the semantic forms into a mood. The mood, for example, may include anger, anxiety, disgust, dejection, fear, grief, guilt, joy, loneliness, love, sadness, shame, and/or surprise.

At block 720 output speech content may be determined from the input speech (e.g., from block 705) and/or the mood. The output speech content may reflect a response to the user and/or a reaction to the user. The content may vary depending on the speech from the user and/or the user's mood. At block 722 output speech may be created that may include a string of words or phrases or sentences. The output speech may be created, for example, using any type of chatbot. At block 724, the output speech is projected from the speakers.

At block 730 visual speech actions may be determined based on the mood and/or the output speech. Visual speech actions, for example, can include movement of the lips, tongue and/or jaw that corresponds with the semantic output. The visual speech actions can be created by referencing a database indicating various visual actions based on the mood and/or the words or portions of words. At block 732, a facial animation can be created that is projected onto the facemask at block 734. In some embodiments, blocks 734 and 724 may be timed to output at the same time to ensure the output speech audio and the visual actions are aligned.

At block 740 a sequence of neck movements may be determined based on the mood. The sequence of neck movements can be created by referencing a database indicating neck movements based on the mood. At block 742 the neck mechanisms can be activated to move the head according to the sequence of neck movements.

At block 750 a sequence of arms and/or shoulders movements may be determined based on the mood. The sequence of arms and/or shoulders movements can be created by referencing a database indicating arms and/or shoulders movements based on the mood. At block 752 the arms and/or shoulders can be activated to move the arms and/or shoulders according to the sequence of arms and/or shoulders movements.

Unless otherwise specified, the term "substantially" means within 5% or 10% of the value referred to or within manufacturing tolerances. Unless otherwise specified, the term "about" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A companion robot comprising:
   a head comprising:
     a facemask; and
     a projector configured to project facial images onto the facemask;
   a facial camera;
   a microphone configured to receive audio signals from the environment;
   a game engine;
   a speaker configured to output audio signals; and
   a processor electrically coupled with the projector, the facial camera, the microphone, the game engine, and the speaker; the processor configured to:
     receive facial images from the facial camera;

receive speech input from the microphone;
determine an audio output based on the facial images and/or the speech input;
determine a facial projection output based on the speech input;
determine a cognitive game based on the speech input and facial images;
present the cognitive game to the user via a user interface;
produce an image of a face related to the cognitive game by the game engine and project it onto the facemask via the projector;
receive a response to the cognitive game from the user via the user interface;
output the audio output via the speaker; and
project the facial projection output on the facemask via the projector.

2. The companion robot according to claim 1, further comprising a neck mechanism physically coupled with the head and in electrical communication with the processor, wherein the processor is configured to determine neck movement based on the audio output and/or the facial images.

3. The companion robot according to claim 1, wherein the processor is further configured to determine a user facial expression that is a representation of a facial expression of a user's face recorded by the facial camera, the audio output being determined based in part on the user facial expression.

4. The companion robot according to claim 1, wherein the processor is further configured to determine a user facial expression that is a representation of a facial expression of a user's face recorded by the facial camera, the facial projection output being determined based in part on the user facial expression.

5. The companion robot according to claim 1, further comprising a 3D camera configured to capture images of the environment that includes a plurality of pixels representing the visual environment and range data, the 3D camera in electrical communication with the processor, wherein the processor is further configured to receive 3D images from the 3D camera, wherein determining an audio output and/or determining a facial projection output is based at least in part on the 3D images.

6. The companion robot according to claim 1, further comprising a user interface, the processor configured to play cognitive games with a user via the user interface.

7. The companion robot according to claim 1, further comprising a user interface, the processor configured to instruct a user regarding a physical exercise via the user interface.

8. A companion robot comprising:
a head comprising a facial display;
a neck mechanism mechanically coupled with the head;
a facial camera;
a game engine;
a microphone configured to receive audio signals from the environment; and
a processor electrically coupled with the facial display, the facial camera, the game engine, the neck mechanism, and the microphone; the processor configured to:
receive facial images from the facial camera;
receive speech input from the microphone;
determine a user's mood based on the speech input and/or the facial images;
select a robot facial image from a subset of facial images based on the user's mood;
select a sequence of neck movements from a subset of neck movements based on the user's mood;
move the head in accordance with the selected sequence of neck movements via the neck mechanism;
determine a cognitive game based on the user's mood;
present the cognitive game to the user via a user interface;
produce an image of a face related to the cognitive game by the game engine and project it onto the facemask via the projector;
receive a response to the cognitive game from the user via the user interface; and
display the selected facial images on the facial display.

9. The companion robot according to claim 8, further comprising a speaker in electric communication with the processor, wherein the speaker is configured to output audio signals, wherein the processor is configured to determine an audio output based on the mood and output the audio output via the speaker.

10. The companion robot according to claim 8, wherein the subset of facial images includes at least two facial expressions selected from the list consisting of anger, joy, disgust, surprise, fear, and sadness.

11. The companion robot according to claim 8, wherein the mood includes a mood selected from the list consisting of anger, joy, disgust, surprise, fear, and sadness.

12. The companion robot according to claim 8, further comprising a 3D camera configured to capture images of the environment that includes a plurality of pixels representing the visual environment and range data, the 3D camera in electrical communication with the processor, wherein the processor is further configured to receive 3D images from the 3D camera, wherein determining an audio output and/or selecting a facial image is based at least in part on the 3D images.

13. The companion robot according to claim 8, further comprising a network interface, wherein the processor is configured to communicate the mood to a caregiver via the network interface.

14. The companion robot according to claim 8, wherein the facial display comprises:
a facemask; and
a projector configured to project facial images onto the facemask.

15. A method for controlling a companion robot, the method comprising:
receiving facial images from a facial camera;
receiving speech input from a microphone;
determining, with a processor, a user's mood based on the speech input and/or the facial images;
selecting a facial image from a subset of facial images based on the user's mood and a history of interactions between a user and the companion robot;
selecting a sequence of neck movements from a subset of neck movements based on the user's mood;
moving a head in accordance with the selected sequence of neck movements;
determining a cognitive game based on the user's mood;
presenting the cognitive game to the user via a user interface;
producing an image of a face related to the cognitive game by the game engine and project it onto the facemask via the projector;
receiving a response to the cognitive game from the user via the user interface; and displaying the selected facial image on a facial display disposed on the head.

16. The method according to claim 15, wherein the selected facial image is displayed by projecting the selected images on a facemask using a projector disposed with the head.

17. The method according to claim 15, wherein the head is moved using one or more neck mechanisms.

18. The method according to claim 15, wherein the selected facial images are displayed on an LED display.

19. A companion robot comprising:
a head comprising:
a facemask; and
a projector configured to project facial images onto the facemask;
motorized arms;
a facial camera;
a game engine;
a microphone configured to receive audio signals from the environment;
a speaker configured to output audio signals; and
a processor electrically coupled with the projector, the motorized arms, the facial camera, the game engine, the microphone, and the speaker; the processor configured to:
receive a user's speech input from the microphone;
receive facial images from the facial camera;
determine an audio output based on the user's speech input;
determine a facial projection output based on the user's speech input;
determine one or more arm motions based on the speech input;
determine a cognitive game based on the user's speech input and facial images;
present the cognitive game to the user via a user interface;
produce an image for a face related to the cognitive game by the game engine and project it onto the facemask via the projector;
receive a response to the cognitive game from the user via the user interface;
output the audio output via the speaker;
project the facial projection output on the facemask via the projector; and
move the motorized arms as per the one or more arm motions.

20. The companion robot according to claim 19, wherein:
the audio output is based on the speech input and the facial images;
the facial projection is based on the speech input and the facial images; and
the one or more arm motions is based on the speech input and the facial images.

21. The companion robot according to claim 19, wherein the processor is configured to provide instructions regarding a physical activity via the motorized arms.

22. A companion robot comprising:
a face screen configured to display facial images;
a microphone configured to receive audio signals from the environment;
a speaker configured to output audio signals;
a 3D camera;
a graphical user interface; and
a processor electrically coupled with the face screen, the microphone, the speaker, the 3D camera, and the graphical user interface; the processor configured to:
receive speech input from the microphone;
determine an audio output based on the speech input;
receive 3D images from the 3D camera;
determine a facial projection output based on the speech input;
present a first cognitive exercise to a user based on the speech input via the graphical user interface;
receive a first response to the first cognitive exercise from the user via the graphical user interface;
determine an activity level of the user based on the 3D images and the first cognitive exercise;
present a second cognitive exercise to the user via the graphical user interface if the determined activity level is low;
output the audio output via the speaker;
project the facial projection output on the face screen.

23. The companion robot according to claim 22, wherein the first cognitive exercise comprises a presenting a cognitive game that includes one or more questions, and the first response is a response to at least one question.

24. The companion robot according to claim 22, wherein the first cognitive exercise comprises displaying one or more images.

25. The companion robot according to claim 22, wherein the first cognitive exercise is selected from a plurality of cognitive exercises based on the speech input.

26. The companion robot according to claim 22, wherein the first cognitive exercise includes a reminder to perform a task.

27. The companion robot according to claim 22, wherein the first cognitive exercise comprises a video conference.

* * * * *